No. 669,516. Patented Mar. 12, 1901.
A. D. FIELD, F. MARGGRAFF, J. DRAHER & D. F. DALTON.
RIVET SETTING MACHINE.
(Application filed Feb. 24, 1899.)
(No Model.) 3 Sheets—Sheet 1.
Fig. 1.
Fig. 2.
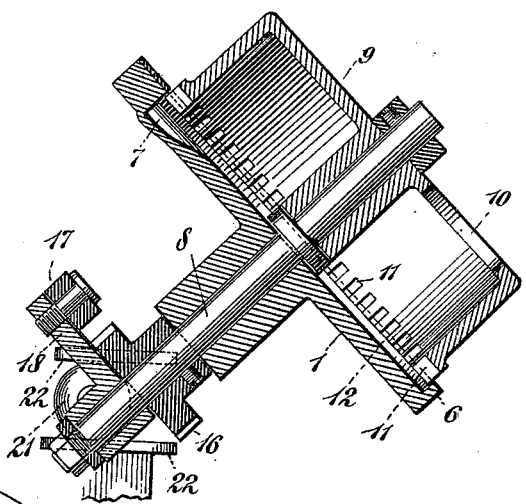
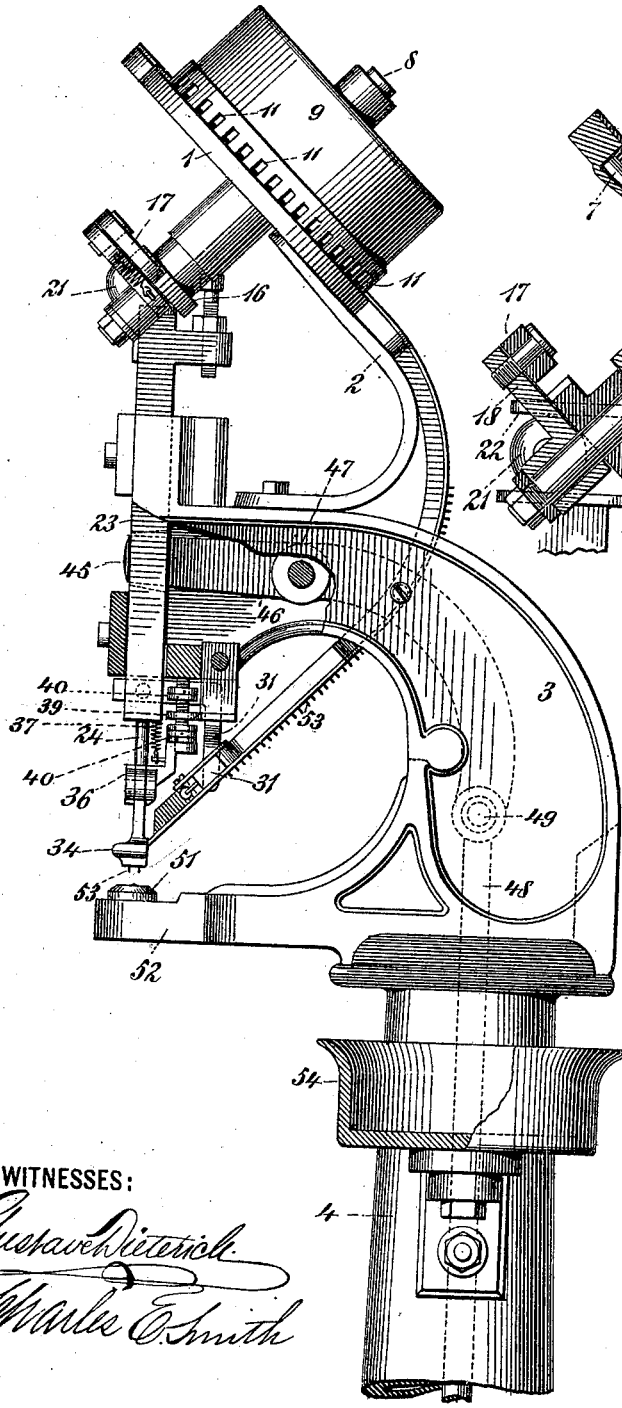
WITNESSES:
INVENTORS
 Albert D. Field,
 Fredrick Marggraff,
 John Draher,
 Daniel F. Dalton
BY
their ATTORNEYS No. 669,516. Patented Mar. 12, 1901.
A. D. FIELD, F. MARGGRAFF, J. DRAHER & D. F. DALTON.
RIVET SETTING MACHINE.
(Application filed Feb. 24, 1899.)
(No Model.) 3 Sheets—Sheet 2.
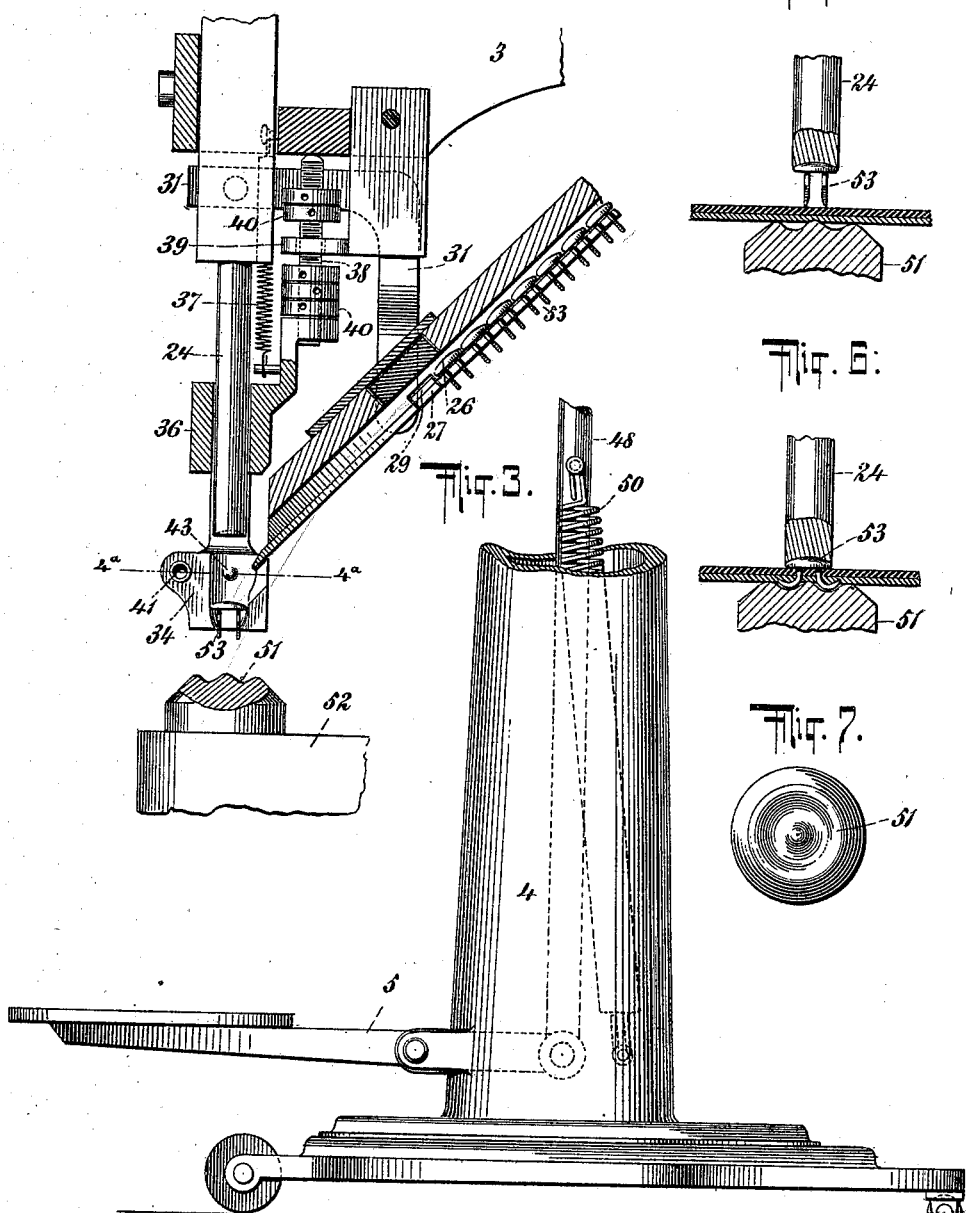
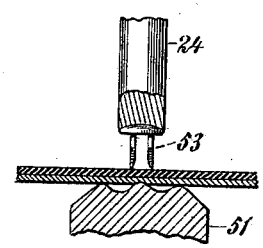
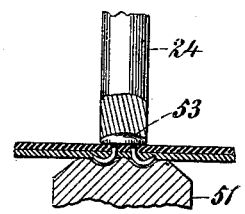
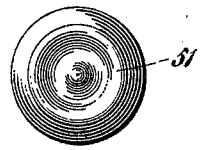
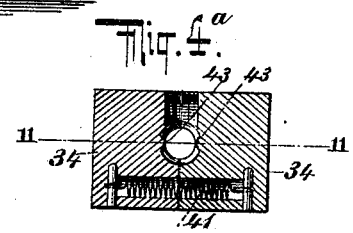
WITNESSES:
Gustave Dieterich
Charles O. Smith
INVENTORS
Albert D. Field,
Fredrick Marggraff,
John Draher,
Daniel F. Dalton
BY Briesen & Knauth
their ATTORNEYS No. 669,516. Patented Mar. 12, 1901.
A. D. FIELD, F. MARGGRAFF, J. DRAHER & D. F. DALTON.
RIVET SETTING MACHINE.
(Application filed Feb. 24, 1899.)
(No Model.) 3 Sheets—Sheet 3.
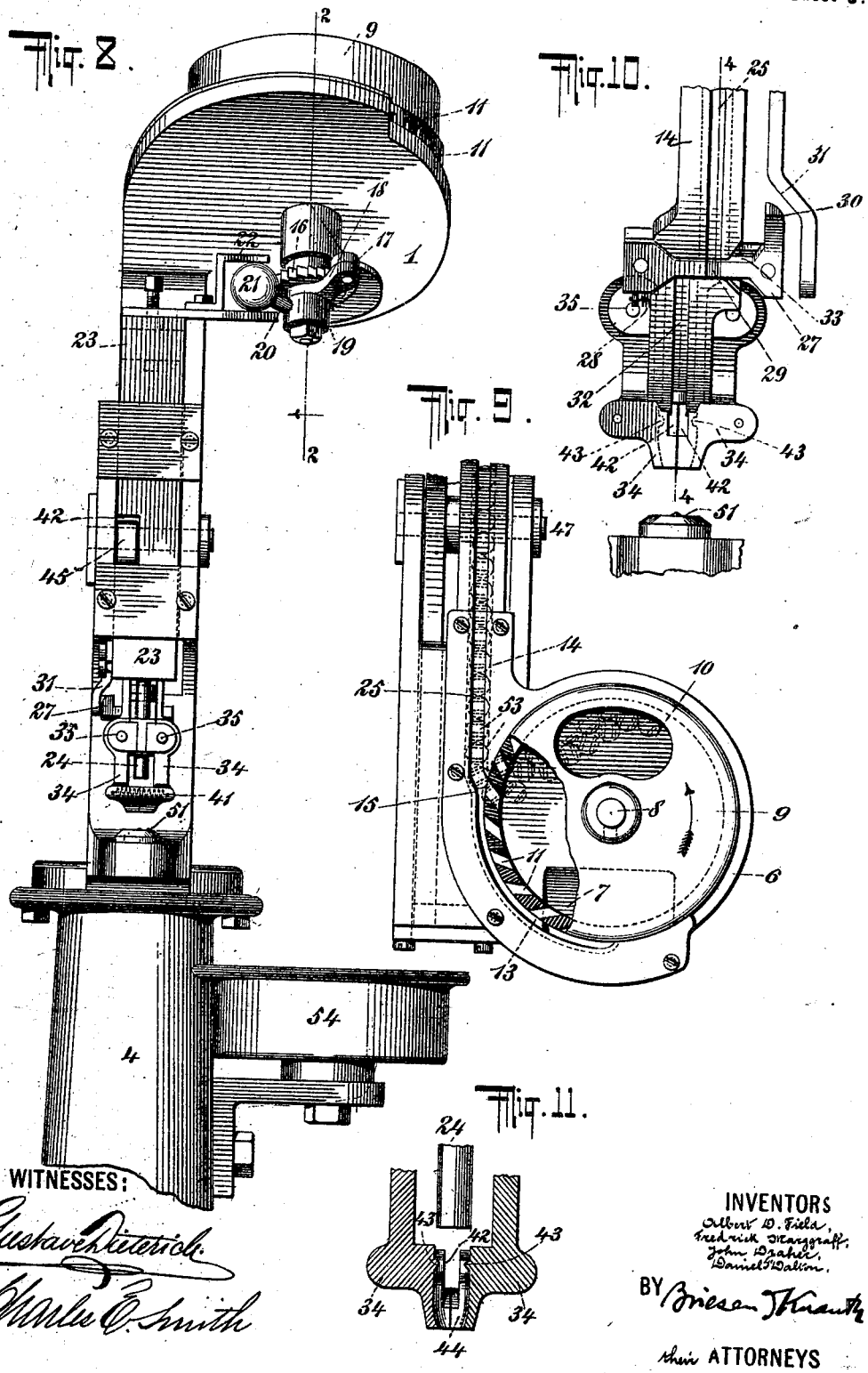
WITNESSES:
INVENTORS
Albert D. Field,
Frederick Marggraff,
John Draher,
Daniel F. Dalton.
BY
their ATTORNEYS
THE NORRIS PETERS CO., PHOTO-LITHO., WASHINGTON, D. C.

UNITED STATES PATENT OFFICE.

ALBERT D. FIELD, FREDRICK MARGGRAFF, JOHN DRAHER, AND DANIEL F. DALTON, OF WATERBURY, CONNECTICUT, ASSIGNORS, BY DIRECT AND MESNE ASSIGNMENTS, TO THE SHOE HARDWARE COMPANY, OF SAME PLACE.

RIVET-SETTING MACHINE.

SPECIFICATION forming part of Letters Patent No. 669,516, dated March 12, 1901.

Application filed February 24, 1899. Serial No. 706,659. (No model.)

*To all whom it may concern:*

Be it known that we, ALBERT D. FIELD, FREDRICK MARGGRAFF, JOHN DRAHER, and DANIEL F. DALTON, residents of Waterbury, New Haven county, in the State of Connecticut, have invented certain new and useful Improvements in Rivet-Setting Machines, of which the following is a specification.

Our invention relates to the rivet-setting machines adapted for a variety of purposes—such, for instance, as riveting buckles to overshoes; and the object of said invention is to provide a simple and efficient rivet-setting machine wherein there is little liability of the machine being choked by the rivets during its operation and a constant and automatic operation of the parts is effected under all conditions.

To these ends our invention consists in the arrangement and combination of parts hereinafter described and claimed.

In the accompanying drawings like characters represent corresponding parts in the various views.

Figure 1 represents a side elevation, with parts broken away, of the upper half of a rivet-machine embodying our invention. Fig. 2 is a central vertical sectional view of a portion of the same, taken on the line 2 2 of Fig. 8. Fig. 3 is a side elevation of the lower portion of the machine, the said view representing a continuation of the parts shown in Fig. 1. Fig. 4 is an enlarged detail sectional view of the riveting mechanism, the said figure being taken on the line 4 4 of Fig. 10. Fig. 4ª is a transverse sectional detail view of the clamping-jaws. Fig. 5 is an enlarged detail sectional view of the riveting punch and die, the same being shown in the positions they assume just prior to the riveting operation. Fig. 6 is a like view of the same, showing the rivet secured in place. Fig. 7 is a top view of the riveting-die. Fig. 8 is a rear elevation of that portion of the machine illustrated in Fig. 1. Fig. 9 is a top view, with parts broken away, of the rotary feed-hopper and the rivet-feed chute communicating therewith. Fig. 10 is an enlarged detail rear elevation of the combined cut-off and feed mechanism to be hereinafter described. Fig. 11 is a vertical sectional detail view of the clamping-jaws, the view being taken on the line 11 11 of Fig. 4ª.

Referring to Figs. 1, 2, and 9 of the drawings, it will be seen that an inclined bottom plate 1 is supported by a bracket 2 upon the main frame 3 of the machine, which main frame is supported by an upright standard 4, to which is pivotally connected a treadle 5. The inclined bottom plate 1 is provided with a circumferential rim 6 and with a depression or pocket 7 near the upper portion thereof. Pivotally secured to this bottom plate, by means of a spindle 8, is what we term a "rotary" feed-hopper 9, which is provided with an opening 10, by means of which the hopper can be charged with rivets. The lower edge of the rotary hopper is provided with a series of rivet-receiving apertures 11, that are each arranged oblique to the outer surface of said hopper. The lower edge of the hopper is maintained slightly elevated above the upper face of the bottom plate 1 to provide a space, as indicated at 12. This space is preferably slightly greater than the thickness of the rivet-heads, so that the rivet-heads may rest within the space between the lower edge of the hopper and the upper face of the base-plate.

Upon reference to Fig. 9 of the drawings it will be observed that the flange 6 of the base-plate 1 does not encircle the hopper throughout its entire extent, but that an enlarged concentric channel 13 is provided at the exterior thereof for a portion of its extent. This opening communicates with a rivet-receiving chute 14, which conveys the rivets 53 to the riveting punch and die in a manner which will be hereinafter pointed out.

It will be observed that when the hopper 9 is rotated in the direction indicated by the arrow in Fig. 9 such of the rivets as are contained in the rivet-receiving apertures 11 will be conveyed to the point 15, where they will drop by their own weight in the rivet conveying or feed chute 14 by reason of the oblique arrangement of the apertures 11. If, as indicated in dotted lines in Fig. 9, the rivets 53 are contained in the chute to the highest point thereof, then the rivets will pass from the apertures 11 into the channel 13 and will be carried around with the hopper until the depression or the pocket 7 in the bottom plate 1 is reached, when the rivets will drop into the pocket and will be conveyed therefrom back into the lowest portion of the hopper, to be again carried up to the feed-chute by succeeding openings or apertures 11 in the hopper. It will be observed that by these means it is impossible to choke the apparatus and that if the hopper tends to feed the rivets to the chute faster than they are fed from the chute to the riveting-punch the rivets will merely fall back into the hopper and will continue to be discharged from the openings or apertures 11 therein until such time as the rivets are lowered in the feed-chute. Upon the spindle 8 is fixed a ratchet-wheel 16, with which a spring-pressed pawl 17 coöperates. This pawl 17 is pivoted to an arm 18, from which projects a sleeve 19. Extending from this sleeve 19 is a stud 20, which carries a ball 21 at its outer extremity. Coöperating with this ball 21 is a yoke 22, which is connected to a slide 23, that carries the riveting-punch 24 of the machine. This ball-and-yoke connection between the pawl-and-ratchet mechanism of the hopper 9 constitutes a universal joint or connection by means of which the pawl 17 is vibrated at each stroke of the riveting-punch, and a rotary movement is thereby transmitted to the hopper. The effect of this rotary motion is to cause the rivets contained in the hopper to settle in the rivet-receiving apertures 11 and to be presented to the feed-chute 14 in a predetermined position—that is to say, with the heads lowermost and the tack-like projections thereof extending through the space 25 in the chute. As the rivets drop by their own weight through the chute 14 they are conveyed to the position represented by the lowermost tack 26 in Fig. 4 of the drawings. In this position the lowermost tack is represented as resting upon what we term the "combined cut-off and transverse feed" 27. This combined cut-off and transverse feed 27 is in the nature of a slide, which is normally maintained in the position illustrated in Fig. 10 of the drawings by a spring 28 and is provided with an aperture 29, which corresponds to the transverse form of the feed-chute. This cut-off 27 is likewise provided with a nose 30, with which a cam 31 is adapted to coöperate. The cam 31 is carried by the slide 23 of the riveting-punch 24, so that each downward movement of the punch will cause the cam 31 to contact with the nose 30 of the cut-off and to force the same laterally against the tension of its spring 28 until the opening in the cut-off is brought into register with the extension 32 of the rivet-chute, which extension 32 communicates directly with the clamping-jaws, as will be hereinafter pointed out. It will be understood that the feed portion 14 of the chute and the discharge portion or extension 32 thereof are out of alinement and that the cut-off 27 is forced from the position represented in Fig. 10 to the position wherein the opening 29 in the cut-off is brought into register with the opening in the extension 32 of the rivet-chute. By these means a rivet will be conveyed from the feed-chute to the extension thereof, and the wall 33 of the cut-off will be brought simultaneously into the path of the feed-chute, thereby supporting the column of rivets. In this manner a single rivet is fed to the clamping-jaws at each movement of the riveting-punch.

The clamping-jaws 34 are each pivoted, as indicated at 35, to a vertically-movable support 36, which is normally maintained in the elevated position by a spring 37. (See Fig. 4.) Projecting upwardly from this support 36 is a fixed screw-threaded spindle 38, which passes freely through an abutment 39, carried by a fixed portion of the framing of the machine. Above and below this abutment capstan-screws 40 are carried upon the spindle 38 and are adapted to contact with the abutment 39 for purposes to be hereinafter described.

The clamping-jaws 34 are normally maintained in the closed position (represented in Fig. 8 of the drawings) by a coiled spring 41, which is preferably contained in a recess formed within the clamping-jaws. Each of these clamping-jaws is provided with a recessed or cut-away portion 42 to allow for the passage of the tack-like portions of the rivets, and each of the jaws is likewise provided with a cam-like teat 43 and an inclined portion 44. The general outline of the rivet-receiving opening in these clamping-jaws is circular in cross-section, as represented in Fig. 4$^a$ of the drawings, and the size of this opening is substantially the same as the diameter of the punch 24.

The punch 24, as before stated, is carried by a slide 23, provided with an aperture 42, in which projects an end 45 of a lever 46, which is pivoted within the casing of the framing 3, as indicated at 47. Connected to the opposite end of the lever 46 is a link or rod 48, as indicated at 49. The lower end of this rod or link 48 is connected to the treadle 5, and these parts are maintained in the normal position by a spring 50, so as to maintain the punch 24 in the elevated position. This spring 50 is connected at the one end to the link 48 and at the other end to the framing or standard 4, as is indicated in Fig. 3. The die 51, with which the punch 24 coöperates, is mounted upon a projecting anvil 52, connected with the framing 3, as indicated in Fig. 1. A cup or receptacle may be mounted upon the framing, as indicated at 54.

Having described the general construction of one form of device embodying the subject-matter of our invention, we will now proceed to describe the operation thereof.

The rivets 53 are first placed within the feed-hopper through the opening 10 in a suitable number, and as the hopper rotates the rivets will drop into the rivet-receiving apertures 11 contained therein and will be fed in the manner hereinbefore described to the point 15, where by reason of the oblique arrangement of the apertures 11 they will drop into the feed-chute 14 and will rest upon the transverse feed and cut-off 27. It is understood, of course, that the hopper should be rotated several times by hand before the machine is intended to be actuated to upset the rivets in order to provide a sufficient number of rivets in the feed-chute 14 to bring about the automatic operation of the device. After a sufficient number of rivets have been conveyed in the manner described to the feed-chute 14 the treadle 5 is depressed after the article has been placed between the punch and die, as represented in Figs. 5 and 6, to receive the rivet. A depression of the treadle 5 will cause the riveting-punch 24 to be forced in a downward direction until the edge thereof has been brought into contact with the cam-like teats 43, when the carrier or vertically-movable support 36 and the clamping-jaws will be carried down with the punch against the tension of the spring 37. This is due to the fact that the tension of the spring 41 of the clamping-jaws is sufficient to overcome the pressure of the riveting-punch against the teats 43. When, however, the carrier, together with the clamping-jaws, has been depressed to the point where the upper set of capstan-screws 40 contact with the abutment 39, there will be a resistance offered to the further downward movement of the carrier, and a further downward movement of the punch 24 will cause the clamping-jaws 34 to be slightly separated by the action of the punch on the teats 43. This separation of the clamping-jaws 34 allows the carrier, together with the jaws, to be elevated until the lower capstan-screws 40 are brought into contact with the abutment 39. At this time the punch will rest between the clamping-jaws with the head thereof upon the rivet, and a further depression of the punch will force the head of the rivet against the inclined walls 44 of the clamping-jaws and will cause said clamping-jaws to be separated sufficiently to allow the punch and rivet to pass therethrough. At this time the punch and rivet are brought substantially into the position represented in Fig. 5, with the points of the rivet bearing on the article to be operated upon. It will be seen that in this position the rivet no longer needs the support of the clamping-jaws and that a further depression of the riveting-punch will force the rivet through the article and turn the tack-like prongs against the die of the machine in the manner represented in Fig. 6. When the punch is again elevated to the normal position, the spring 41 will cause the clamping-jaws to be brought together again into the position represented in Fig. 11, when they are adapted to receive another rivet, after which the operation may be repeated as before.

While we have described an apparent step-by-step depression of the punch 24 and the various operations of the clamping-jaws during these depressions, it will be understood that a single quick depression of the punch accomplishes the work described and that the automatic feeding and turning of the rivets is accomplished with great rapidity.

Having described our invention, what we claim, and desire to secure by Letters Patent, is—

1. The combination of a riveting-punch, a carrier or slide therefor, a rotary feed-hopper, a ratchet-wheel for said hopper, a pawl coöperating with said ratchet-wheel, a vibratory arm to which said pawl is pivoted, a ball connected to said arm and a yoke carried by the punch-slide and coöperating with the ball to effect a rotation of the hopper at each depression of the punch.

2. The combination of a riveting-punch, vertically-movable rivet-receiving jaws, a carrier therefor, a screw-threaded spindle carried by said carrier, an abutment carried by a fixed portion of the machine and through which abutment the screw-threaded spindle passes freely and nuts carried by said spindle above and below the abutment to contact therewith and thus limit the vertical movement of the jaws.

ALBERT D. FIELD.
FREDRICK MARGGRAFF.
JOHN DRAHER.
DANIEL F. DALTON.

Witnesses as to A. D. F., F. M., and D. F. D.:
EMMA JUDGE,
HENRY W. MINOR.
Witnesses as to J. D.:
M. JOHN RYAN,
HENRY W. MINOR.